United States Patent
Ting et al.

(10) Patent No.: US 8,513,144 B2
(45) Date of Patent: Aug. 20, 2013

(54) PROPERTY FILMS FROM RENEWABLE POLYMERS

(75) Inventors: Yuan-Ping R. Ting, Plainsboro, NJ (US); Simon J. Porter, Allentown, PA (US); Alex V. Del Priore, Chandler, PA (US)

(73) Assignee: Honeywell International Inc

(*) Notice: Subject to any disclaimer, the term of this patent is extended or adjusted under 35 U.S.C. 154(b) by 801 days.

(21) Appl. No.: 12/126,376

(22) Filed: May 23, 2008

(65) Prior Publication Data
US 2008/0311813 A1 Dec. 18, 2008

Related U.S. Application Data

(60) Provisional application No. 60/944,213, filed on Jun. 15, 2007.

(51) Int. Cl.
| | |
|---|---|
| *B32B 5/02* | (2006.01) |
| *B32B 5/16* | (2006.01) |
| *B32B 27/30* | (2006.01) |
| *B32B 27/12* | (2006.01) |
| *B29C 65/48* | (2006.01) |
| *B29C 65/54* | (2006.01) |

(52) U.S. Cl.
USPC ............. 442/71; 442/72; 442/76; 442/85; 442/86; 442/396; 156/60; 156/176

(58) Field of Classification Search
USPC ............. 442/70, 74, 76, 79, 85, 394, 396; 156/60
See application file for complete search history.

(56) References Cited

U.S. PATENT DOCUMENTS

| | | | | |
|---|---|---|---|---|
| 4,906,495 | A * | 3/1990 | Martini et al. | 428/36.7 |
| 5,391,423 | A * | 2/1995 | Wnuk et al. | 428/217 |
| 5,492,741 | A | 2/1996 | Akao et al. | 428/35.2 |
| 5,506,041 | A | 4/1996 | Tanaka et al. | 428/219 |
| 5,869,193 | A * | 2/1999 | Langley | 428/520 |
| 6,517,575 | B1 | 2/2003 | Yang et al. | 623/1.44 |
| 6,673,403 | B1 | 1/2004 | Shiiki et al. | 428/35.7 |
| 6,703,115 | B2 | 3/2004 | Hale et al. | 428/212 |
| 7,077,994 | B2 | 7/2006 | Bond et al. | |
| 7,172,814 | B2 | 2/2007 | Hodson | 428/479.6 |
| 7,416,767 | B2 * | 8/2008 | Wilhoit et al. | 428/36.7 |
| 2003/0199218 | A1 * | 10/2003 | Mueller et al. | 442/394 |
| 2004/0092672 | A1 | 5/2004 | Bastioli et al. | |
| 2004/0097157 | A1 * | 5/2004 | Cosentino | 442/394 |
| 2004/0197512 | A1 | 10/2004 | Gavel et al. | 428/40.1 |
| 2005/0148759 | A1 | 7/2005 | Mueller et al. | 528/354 |
| 2005/0208238 | A1 * | 9/2005 | Flemmer et al. | 428/34.1 |
| 2006/0194010 | A1 | 8/2006 | Hiscock | 428/35.7 |
| 2006/0240726 | A1 | 10/2006 | Hodson | 442/59 |
| 2007/0042207 | A1 | 2/2007 | Berger et al. | |
| 2007/0051787 | A1 * | 3/2007 | Schille et al. | 229/122.32 |
| 2007/0238384 | A1 * | 10/2007 | Tang et al. | 442/381 |

FOREIGN PATENT DOCUMENTS
WO    2005095499    10/2005

* cited by examiner

*Primary Examiner* — Jennifer A Steele

(57) ABSTRACT

High barrier multilayer films incorporating a biodegradable polymer layer. More particularly, biodegradable insulation facing materials and insulation articles incorporating a biodegradable polymer layer. The structures have excellent barrier properties and superior mechanical strength.

17 Claims, 1 Drawing Sheet

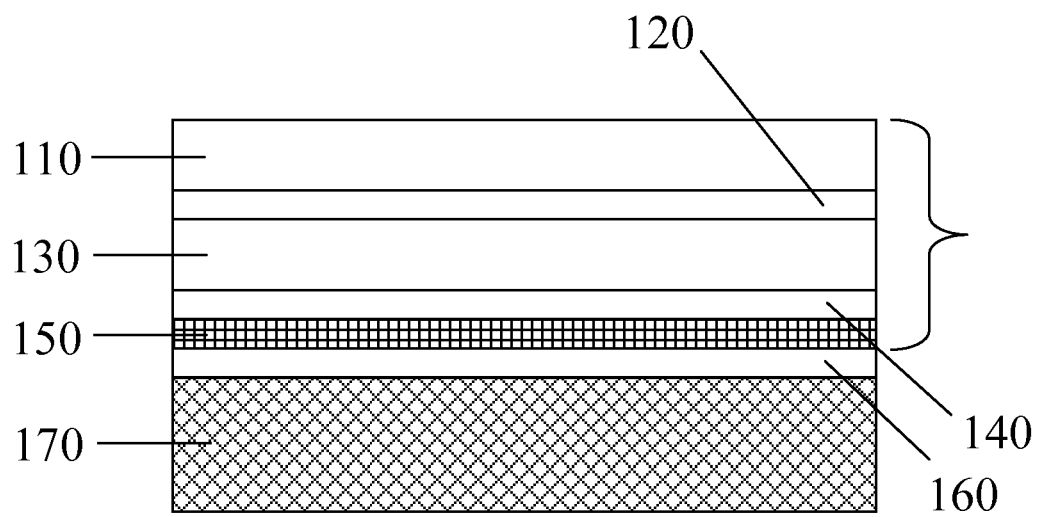

PROPERTY FILMS FROM RENEWABLE POLYMERS

CROSS-REFERENCE TO RELATED APPLICATION

This application claims the benefit of U.S. Provisional Patent Application Ser. No. 60/944,213 filed Jun. 15, 2007.

BACKGROUND OF THE INVENTION

1. Field of the Invention

The present invention relates to high barrier multilayer films incorporating a biodegradable polymer layer. More particularly, the invention pertains to biodegradable insulation facing materials incorporating a biodegradable polymer layer.

2. Description of the Related Art

A wide variety of polymers and films formed from such polymers are known. Important physical characteristics of such films include its barrier properties, including barriers to gas, aroma, and/or vapor such as water vapor, as well as its physical characteristics, such as toughness, wear and weathering resistances, and light-transmittance. It is also well known to manufacture polymeric film articles for use in a wide array of applications, such as packaging applications. Many such articles are made of multiple layers of different plastics in order to achieve various desired physical and chemical properties.

Conventionally, synthetic polymers such as polyethylene ("PE"), polypropylene ("PP") and polyethylene terephthalate ("PET"), etc. are widely used as materials for manufacturing multilayer packaging materials for containing various objects. After use, disposal of the used packaging materials frequently leads to their being sent to a facility where they are decomposed by incineration at high temperatures. However, the incineration of such synthetic polymers typically generates substances that contaminate the air and pollute the environment. These materials are also high in heat buildup when burned and there is a possibility of damaging the incinerator during burning treatment. Other materials, such as polyvinyl chlorides, cannot be burned because they have self-extinguishing properties. One common means to ameliorate this problem is by recycling and reusing the materials, but recycling can be very expensive and often is not economically feasible. Such synthetic polymer materials that are disposed without being incinerated or recycled typically are buried in landfills and generally do not decompose, permanently taking up space as waste.

In view of these issues, biodegradable polymers and products formed therefrom are becoming increasingly important. Biodegradable polymers are typically produced from annually renewable resources, such as corn or sugarcane, and may be naturally produced, modified naturally produced or synthetically produced. One particularly desirable family of biodegradable polymers is polylactic acids ("PLAs"), also referred to as polylactides. PLAs are synthetic aliphatic polyesters derived from renewable resources. Bacterial fermentation of corn starch or sugarcane produces lactic acid which is then condensation polymerized to form PLA.

Polylactic acids are desirable because their heat buildup during burning is less than half that of polyethylene and they are naturally decomposed in soil or water. However, other less desirable properties limit the broad market entry of PLAs and other biodegradable polymers in plastics industries compared to a conventional polymer such as polyethylene or polystyrene. For example, polylactides and other biodegradable polymers such as polyhydroxyalkanoates ("PHAs") have poor gas and moisture barrier properties and are not well suited for use as packaging materials or in other applications where a high barrier to gas and/or moisture is desired. Films produced from such annually renewable materials tend to be noisy when deformed and many compositions that have excellent degradability have only limited processability. Additionally, films produced from annually renewable materials have a tendency to easily tear and crack, in addition to having poor gas and moisture barrier properties.

Accordingly, there is a need for environmentally friendly multilayer film structures having good processability and a high barrier to gas and moisture transmission that are useful as insulation facings. The present application provides a solution to this need.

SUMMARY OF THE INVENTION

The invention provides a multilayer article comprising, in order:
a) a biodegradable polymer layer;
b) an optional intermediate adhesive primer layer;
c) a moisture barrier layer having a moisture permeability rate of about 1 perm or less at 25% relative humidity and 21° C. as determined by 50% dry-cup method of ASTM E96, Procedure A;
d) a first adhesive tie layer; and
e) a fibrous substrate on the first adhesive tie layer.

The invention also provides a method of producing a multilayer article, comprising:
a) providing a biodegradable polymer layer;
b) optionally applying an intermediate adhesive primer layer onto the biodegradable polymer layer;
c) applying a moisture barrier layer onto the biodegradable polymer layer, the moisture barrier layer having a moisture permeability rate of about 1 perm or less at 25% relative humidity and 21° C. as determined by 50% dry-cup method of ASTM E96, Procedure A;
d) applying a first adhesive tie layer onto the moisture barrier layer; and
e) applying a fibrous substrate on the first adhesive tie layer.

BRIEF DESCRIPTION OF THE DRAWINGS

FIG. 1 is a plan-view, schematic representation of a multi-layered article of the invention including a fibrous substrate, which article is useful as an insulation facing material.

DETAILED DESCRIPTION OF THE INVENTION

The multilayer films and articles of the invention comprise at least one biodegradable polymer layer attached to at least one high barrier moisture barrier layer to thereby increase the moisture barrier properties of the combined film structure. For an insulation facing material, the moisture barrier layer preferably has a sufficiently minimal thickness to produce multilayer structures that are preferably at least about 90% biodegradable, while achieving the desired mechanical strength and moisture penetration resistance values specified herein.

Suitable biodegradable polymeric materials used for producing the biodegradable polymer layers of the inventive multilayer films generally include all naturally produced biodegradable polymers, modified naturally produced biodegradable polymers or synthetically produced biodegradable polymers that are preferably derived from one or more polymers formed from naturally renewable resources. These include biodegradable aliphatic-aromatic copolymers, aliphatic polyesters having units formed from at least one of a lactide or a hydroxyacid having at least 4 carbon atoms, polyesters having units formed from succinic acid and an aliphatic diol, polyhydroxyalkanoates, and modified polyethylene terephthalate in which a portion of the terephthalate groups are substituted with at least one aliphatic diacid. Particularly useful biodegradable polymers include homopolymers and copolymers non-exclusively including PLA, PLA derivatives, polylactic acid/aliphatic polyester copolymer, polyglycolic acid polymers, polycaprolactone, polylactic acid/caprolactone copolymer, a terpolymer having units formed from glycolide, lactide and ε-caprolactone, polyesteramide, polyhydroxybutyrate, poly(3-hydroxybutyric acid), poly(3-hydroxybutyrate-co-3-hydroxyhexanoate), polyhydroxybutyrate-hydroxyvalerate copolymer, polybutylene succinate, poly(butylene succinate/adipate), polybutylene succinate-co-adipate-co-terephthalate, poly(caprolactone-butyrene succinate), polyester carbonate, poly(butylene succinate/carbonate), polyethylene succinate, polyethylene succinate adipate copolymer, poly(butylene adipate/terephthalate), polyethylene terephthalate copolymer, polyethylene terephthalate-co-succinate, poly(tetramethylene adipate/terephthalate), polyethylene sebacate, polyvinyl alcohol, chitosan, chitosan/cellulose polymers, cellulose acetate based polymers, thermoplastic starch-based and denatured starch-based polymers, polymers formed from other polysaccharides and proteins, copolymers or terpolymers of 1,4-butanediol, succinic acid, adipate and lactic acid, and combinations of the above. Preferred are polymers having a number average molecular weight of 1000 Mn or more, more preferably from about 1000 Mn to 500,000 Mn and most preferably from about 1000 Mn to about 100,000, depending on the polymer.

Biodegradable polymers are well known in the art and are widely commercially available. Well known useful biodegradable polymers non-exclusively include BIOMAX® modified polyethylene terephthalate polymers commercially available from E.I. du Pont de Nemours and Company of Wilmington, Del.; ECOFLEX® petroleum-based aliphatic-aromatic copolymers commercially available from BASF of Germany; ECOVIO® polylactic acid containing polymers from BASF; MATER-BI® starch-based polymers commercially available from Novamont of Italy; NATUREWORKS® PLA polymers commercially available from NatureWorks LLC of Minnetonka, Minn.; EVLON® PLA polymers commercially available from BI-AX International Inc. of Ontario, Canada; LACEA® PLA polymers commercially available from Mitsui Chemicals Inc. of Japan; GS PLA™ polymers and BIOGREEN™ commercially available from Mitsubishi Chemical Corp. of Japan; CELGREEN™ polymers commercially available from Daicel Chemical Industries, LTD. of Japan; VYLOECOL® polylactic acid polymers commercially available from Toyobo Co. LTD. of Japan; BIONELLE™ polymers commercially available from Showa Highpolymer Co., LTD. of Japan; LUNARE™ polymers commercially available from Nippon Shokubai of Japan; and MOWIOL® and KURARAY POVAL® polymers commercially available from Kuraray Co., LTD. of Japan. Most preferred biodegradable polymers are polylactic acid polymers and polymers that are 100% bio-based materials, meaning that they are completely produced from annually renewable natural resources rather than petroleum-based resources.

In the preferred embodiment of the invention, the biodegradable polymer layer has a preferred base weight of from about 15.0 grams/m$^2$ to 60 g/m$^2$, more preferably from about 15.0 g/m$^2$ to 35.0 g/m$^2$. More particularly, the biodegradable polymer layer preferably comprises a polylactic acid layer having the following properties, wherein a 48 gauge (ga), 15.5 g/m$^2$ (gsm) layer is the most preferred:

| Film | Yield (in$^2$/lb) | GSM | oz/yd$^2$ | lb/ream | |
|---|---|---|---|---|---|
| 48 ga PLA | 45,400 | 15.5 | 0.46 | 9.5 | Lowest |
| 200 ga PLA | 11,350 | 62.0 | 1.84 | 38.0 | Highest |
| 48 ga PLA | 45,400 | 15.5 | 0.46 | 9.5 | Most Preferred |

The biodegradable polymer layer is attached to one or more moisture barrier layers. The application of a high barrier, moisture barrier layer coating onto one or two sides of a biodegradable polymer film substrate provides significant moisture barrier property enhancement. As used herein, a moisture barrier layer comprises a thermoplastic polymer layer having a moisture permeability rate of about 1 perm or less at 25% relative humidity ("RH") and 21° C. according to the 50% desiccant, dry-cup method of ASTM E96, Procedure A. Preferably, the moisture barrier layer also has a moisture permeability rate of from about 1 perm to about 40 perm at 95% RH and 21° C. according to the 90% wet-cup method of ASTM E96, Procedure B. ASTM E96 measures the weight of water in grams that pass through one square meter of a material in a 24-hour period. A perm value of 1.0 perm means that under a vapor pressure differential of 1 mm of mercury, 0.66 grams of water vapor will diffuse through each m$^2$ of surface per 24 hours. More preferably, the moisture barrier layer comprises a polymer layer having a moisture permeability rate of about 0.5 perm or less at 25% RH and 21° C. as determined by ASTM E96, Procedure A (50% dry cup), and from about 5 perm to about 40 perm at 95% RH and 21° C. as determined by ASTM E96, Procedure B (90% wet cup). Most preferably, the moisture barrier layer comprises a polymer layer having a moisture permeability rate of about 0.25 perm or less at 25% RH and 21° C. as determined by ASTM E96, Procedure A (50% dry cup), and from about 20 perm to about 40 perm at 95% RH and 21° C. as determined by ASTM E96, Procedure B (90% wet cup). The minimum coating weight to achieve these perm requirements is 0.07 lb/ream for an in-line processed, biaxially oriented layer, and 1.2 lb/ream for a regular, off-line coating.

By itself, the biodegradable polymer layer does not have acceptable moisture barrier properties for an insulation facing material. When combined with a moisture barrier layer, the moisture barrier property is improved to an acceptable level. For example, a 1 mil (25.4 μm) biaxially oriented PLA layer has perm value of about 8 to about 9 at 25% RH and 21° C. as determined by ASTM E96, Procedure A (50% dry cup). The application of a polyvinylidene chloride ("PVdC") coating onto a surface of the PLA layer reduces this perm value to about 1 or less. This is a significant enhancement of the moisture barrier property. The high barrier coating may also provide the added advantage of excellent heat sealing characteristics by using the coating as a heat sealant material. For example, a PVdC coating provides an improved heat seal capability, having a heat seal temperature of 300° F. (148.9° C.) compared to 350° F. (176.7° C.) for PLA. Some coatings also reduce the wrinkling tendency of the film and improve the bond of adhesive materials between the moisture barrier layer and the fibrous substrate (e.g. strong bonding of acrylic copolymers and other adhesives to PVdC).

Suitable moisture barrier layers having these moisture barrier properties non-exclusively comprise polyvinylidene chloride, polyvinyl alcohol (PVOH), polyvinyl acetate (PVA), polyolefins including polyethylenes and polypropylene, polyamides, extrudable grade ethylene vinyl acetate (EVA), extrudable grade ethylene acrylic acid (EAA), ethylene vinyl alcohol copolymers (EVOHs) and combinations thereof, such as a polyamide/EVOH/polyamide coextrusion.

Most preferably, the moisture barrier layer comprises a polyvinylidene chloride polymer. Moisture barrier layers achieving the above perm values may have a coating weight of from about 0.05 lb/ream to about 5.0 lb/ream, more preferably from about 0.07 lb/ream to about 2.5 lb/ream to achieve the above perm values and to produce a multilayer film that is at least 90% biodegradable. In a most preferred embodiment of the invention, the moisture barrier layer comprises a polyvinylidene chloride layer having the following properties, wherein a 1.0 lb/ream (ppr) film is the most preferred:

| Film (in²/lb) | Yield (in²/lb) | GSM | oz/yd² | lb/ream | |
|---|---|---|---|---|---|
| 0.2 ga PVdC | 4,320,000 | 0.16 | 0.0048 | 0.05 | Lowest |
| 20 ga PVdC | 86,400 | 8.1 | 0.24 | 5.0 | Highest |
| 4 ga PVdC | 432,000 | 1.63 | 0.048 | 1.0 | Most Preferred |

Optionally, moisture barrier layer 130 may be a nanocomposite. As used herein, a nanocomposite comprises a thermoplastic polymer blended with a nanometer scale clay, also known as a nanoclay. Nanocomposites and methods for their formation are well known in the art. The nanoclay may comprise a material such as montmorillonite, pyrophyllite, hectorite, vermiculite, beidilite, saponite, nontronite, fluoromica or a combination thereof. The thermoplastic polymer forming layer 130 may comprise any of the polymeric materials specified above for layer 130. In the preferred embodiment of the invention, the nanoclay comprises from about 0.5 to about 5.0 percent by weight of said nanocomposite, more preferably from about 3.0 to about 5.0 percent by weight of said nanocomposite. Accordingly, the thermoplastic polymer preferably comprises from about from about 95.0 to about 99.5 percent by weight of said nanocomposite, more preferably from about 95.0 to about 97.0 percent by weight of said nanocomposite.

The moisture barrier layer may optionally be attached to the biodegradable polymer layer via an intermediate adhesive primer layer. The adhesive primer layer may be applied either directly onto the biodegradable polymer layer or onto the moisture barrier layer by any appropriate means in the art, such as by coating. Each adhesive layer described herein, including the adhesive primer layer and all adhesive tie layers, may comprise any suitable adhesive material as would be determined by one skilled in the art. Suitable adhesives non-exclusively include polyurethanes, epoxies, ethylene vinyl acetate copolymer, polyesters, acrylics, anhydride modified polyolefin and blends thereof. Modified polyolefin compositions have at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. Preferably, the adhesive primer layer is a one or two component urethane. Preferred urethane based adhesives are commercially available, for example, from Henkel Technologies, based in Düsseldorf, Germany, including polyurethanes commercially available from the Liofol Company (a division of Henkel Technologies) under the trademark TYCEL®.

Each adhesive primer layer or adhesive tie layer described herein has a preferred coating weight of about 0.5 lb/ream to about 6 lb/ream, more preferably from about 1.0 lb/ream to about 4.0 lb/ream. More particularly, the adhesive layer preferably has the following properties, wherein a 1.5 lb/ream (ppr) film is the most preferred:

| Coating Weight (lb/ream) | lb/ream | GSM | Oz/yd² | |
|---|---|---|---|---|
| 0.5 ppr adhesive | 0.5 | 0.8 | 0.02 | Lowest |
| 6 ppr adhesive | 6.0 | 10 | 0.29 | Highest |
| 1.5 ppr adhesive | 1.5 | 2.4 | 0.07 | Most Preferred |

In one embodiment of the invention, illustrated in FIG. 1 (not drawn to scale), an article 100 is provided that is particularly useful as a biodegradable insulation facing material, serving as a biodegradable substitute for conventional kraft paper. As shown in FIG. 1, multilayer article 100 includes a biodegradable polymer layer 110 attached to a first surface of a moisture barrier layer 130 optionally via an intermediate adhesive primer layer 120, and a fibrous substrate 150 attached to a second surface of the moisture barrier layer 130 via a first adhesive tie layer 140. Also shown is an insulation material 170 that is attached to the fibrous substrate 150 via a second adhesive tie layer 160.

Adhesive layers 140 and 160 may be applied by any appropriate means in the art, such as by coating, onto a surface of either adjacent layer. Any suitable adhesive material may be employed. Preferred adhesives include the adhesive primer materials listed previously.

Fibrous substrate 150 may be either a woven or non-woven fabric. Preferably, the fibrous substrate is non-woven. More particularly, fibrous substrate 150 preferably comprises a tear resistant fabric, providing the multilayer structure with enhanced mechanical strength. Such tear resistant fabrics are preferably tear resistant in both the longitudinal (machine) and transverse directions and preferably have a tear resistance of greater than 25 g/fabric, more preferably greater than about 50 g/fabric, and most preferably greater than 100 g/fabric, as determined by the ASTM D1922-06a Elmendorf tear testing method. In a preferred embodiment of the invention, the fibrous substrate 150 comprises an open mesh, tear resistant fabric. As used herein, an open mesh, tear resistant fabric refers to a net-like fabric structure, or a scrim, comprising woven or non-woven polymeric fibers. The term scrim, as used herein, is used to describe any type of open mesh structure that is either woven or non-woven. Woven scrims may have any type of weave, and non-woven scrims are produced using any well known technique, including spun lace and spunbond techniques, such that it may be applied as a continuous roll. Suitable scrims are commercially available from, for example, Atlanta Nisseki CLAF, Inc. of Kennesaw, Ga., including SS and LS grade CLAF® materials.

Suitable polymeric fibers used to produce the fibrous substrate non-exclusively include polyamides, polyesters and polyolefins, particularly polyethylene and polypropylene, or a combination thereof. Suitable fibers also include biodegradable polymeric fibers, such as poly-ε-caprolactone biodegradable fibers, poly-β-propiolactone biodegradable fibers or a combination thereof. Particularly preferred biodegradable non-woven fabrics useful herein are described in U.S. Pat. No. 5,506,041, which is incorporated herein by reference.

Also preferred are fabrics produced from biodegradable INGEO® fibers commercially available from NatureWorks LLC and LACTRON® fibers commercially available from Kanebo, LTD. of Japan. The fibrous substrate may also comprise a fusible binder material, also known as a polymeric matrix material. Such binder or matrix materials are commonly used to consolidate multiple plies of non-woven fibers into monolithic non-woven fabrics. For example, the fibrous substrate may embody multiple overlapped plies, and preferably includes from about 2 to about 5 overlapped and consolidated plies. Suitable matrixes for use herein non-exclusively include low modulus polymers, such as low modulus elastomers having an initial tensile modulus (modulus of elasticity) of less than about 6,000 psi (41.3 MPa) as measured at 37° C. by ASTM D638. Preferred low modulus polymeric matrix materials include styrenic block copolymers commercially available from Kraton Polymers of Houston, Tex. under the trademark KRATON®.

Most preferably, the fibrous substrate comprises polypropylene, high density polyethylene, biodegradable fibers, or a combination thereof. One particularly preferred material for the fibrous substrate is non-woven, spunbond polypropylene fabric, such as fabric style #308092 commercially available from Sommers Inc. of Coral Gables, Fla. This type of fabric combines good tear strength, low smoke, and good softness properties. These are very important characteristics for an insulation facing material. In the preferred embodiments of the invention, the fibrous substrate has an areal density of from about 6 g/m$^2$ (gsm) to about 60 gsm, more preferably from about 9 gsm to about 30 gsm and most preferably from about 9 gsm to about 15 gsm.

Accordingly, a most preferred biodegradable insulation facing article of the invention would have the following structure: PLA/PVdC/adhesive/polypropylene non-woven fabric. As stated above, multilayer article 100 may be attached to an insulation material 170, serving as a biodegradable facing material. Insulation material 170 may comprise any insulation material such as building insulation formed from fiberglass, mineral fibers, combinations of fiberglass and mineral fibers, or any other material that uses an insulation facing. This listing of materials is not intended to be limiting. In view of the above, a particularly preferred insulation article of the invention would have the following structure: PLA/PVdC/adhesive/polypropylene non-woven fabric/adhesive/fiberglass insulation.

The multilayer films of the invention may further have printed indicia on or between component layers. Such printing is typically on an internal surface of the structures and methods of application are well known in the art. As used herein, printed indicia will typically be applied onto the biodegradable polymer layer.

Supplementing any of the additives described above, each biodegradable polymer layers, moisture barrier layers, adhesive layers and other polymer layers described herein may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Such may be used in amounts, for example, of up to about 10% by weight of the overall composition.

Representative ultraviolet light stabilizers include various substituted resorcinols, salicylates, benzotriazole, benzophenones, and the like. Suitable lubricants and release agents include stearic acid, stearyl alcohol, and stearamides. Exemplary flame-retardants include organic halogenated compounds, including decabromodiphenyl ether and the like as well as inorganic compounds. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art.

Although each layer of the multilayer film structure may have a different thickness, the thickness of the biodegradable polymer layer is preferably from about 10 µm to about 50 µm, more preferably from about 12 µm to about 25 µm, and most preferably from about 12 µm to about 15 µm. Preferably, the biodegradable polymer layer comprises at least about 90% of the total thickness of the multilayer structure. The thickness of the moisture barrier layer is preferably very thin, preferably from about 0.03 µm to about 6 µm, more preferably from about 0.3 µm to about 3.0 µm, and more preferably about 0.3 µm to about 1.5 µm. It is most preferred that the moisture barrier layer have the lowest possible thickness for the selected moisture barrier polymer that is sufficient to achieve the perm values specified herein while also producing multilayer structures that are preferably at least about 90% biodegradable. Accordingly, in most embodiments the moisture barrier layer will have a thickness of about 4 µm or less, and will typically comprise at least about 0.6% of the total multilayer film thickness (excluding an insulation material). The thickness of the fibrous substrate is preferably from about 75 µm to about 250 µm, more preferably from about 100 µm to about 200 µm and most preferably from about 100 µm to about 150 µm. The thickness of the each adhesive primer layer and adhesive tie layer is preferably from about 1 µm to about 30 µm, more preferably from about 3 µm to about 20 µm, and most preferably from about 5 µm to about 15 µm. The overall multilayer films of the invention (excluding an insulation material) have a preferred total thickness of from about 400 µm to about 650 µm, more preferably from about 425 µm to about 625 µm and most preferably from about 450 µm to about 600 µm. While such thicknesses are preferred, it is to be understood that other film thicknesses may be produced to satisfy a particular need and yet fall within the scope of the present invention.

The multilayer articles of this invention may be produced by conventional methods useful in producing multilayer films, including coating, extrusion/coextrusion, lamination, gravure coating, extrusion coating and extrusion lamination techniques. In a typical coextrusion process, the polymeric material for the individual layers are fed into infeed hoppers of a like number of extruders, each extruder handling the material for one or more of the layers. The melted and plasticated streams from the individual extruders are directly fed to a multi-manifold die and then juxtaposed and combined into a layered structure or combined into a layered structure in a combining block and then fed into a single manifold or multi-manifold co-extrusion die. The layers emerge from the die as a single multiple layer film of polymeric material. After exiting the die, the film is cast onto a first controlled temperature casting roll, passes around the first roll, and then onto a second controlled temperature roll. The controlled temperature rolls largely control the rate of cooling of the film after it exits the die. Additional rolls may be employed. In another method, the film forming apparatus may be one which is referred to in the art as a blown film apparatus and includes a multi-manifold circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017. One advantage of coextruded films is the formation of a multilayer film in a one process step by combining molten layers of each of the film layers, as well as any other optional film layers, into a unitary film structure.

Alternately, the individual layers may first be formed as separate layers and then laminated together under heat and pressure with or without intermediate adhesive layers. Lamination techniques are well known in the art. Typically, laminating is done by positioning the individual layers on one another under conditions of sufficient heat and pressure to cause the layers to combine into a unitary film. Typically the layers are positioned on one another, and the combination is passed through the nip of a pair of heated laminating rollers by techniques well known in the art. Lamination heating may be done at temperatures ranging from about 100° F. (37.78° C.) to about 300° F. (148.9° C.), preferably from about 150° F. (65.56° C.) to about 250° F. (121.1° C.), and more preferably at from about 150° F. (65.56° C.) to about 200° F. (93.33° C.), at pressures ranging from about 20 psi (137.9 kPa) to about 80 psi (551.6 kPa), more preferably from about 40 psi (275.8 kPa) to about 60 psi (413.7 kPa), for from about 10 seconds to about 3 minutes, preferably from about 20 seconds to about 1 minute.

Also suitable are conventional coating techniques or other non-extrusion deposition methods, such as extrusion coating. Extrusion coating is a process where a molten polymer is applied onto a solid support and passes on a cooling cylinder at the contact of which the polymer adheres to the support. Typically, a combination of these techniques will be used to produce the multilayer articles of the invention. For example, the biodegradable polymer layer may be a cast film, or may be coextruded with an intermediate primers layer. Extrusion coating is the preferred method for applying a moisture barrier layer onto the biodegradable polymer layer, particularly for a moisture barrier layer having a thickness of about 4 µm or less because the layer is too thin to be effectively extruded into a film. The first adhesive tie layer may be coated or extruded onto the moisture barrier layer, or onto the fibrous substrate, and the fibrous substrate will typically be attached by lamination.

In order to improve interlayer adhesion, the biodegradable polymer layer and/or the moisture barrier layer and/or the other layers, may optionally be subjected to a corona treatment. A corona treatment is a process in by which a layer of material is passed through a corona discharge station giving the surface of the layer a charge that improves its ability to bond to an adjacent layer. If conducted on the moisture barrier layer, corona treatment is preferably conducted after attachment to the biodegradable polymer layer. Preferably, the layer or layers are subjected to about 0.5 to about 3 kVA-min/m² of corona treatment. More preferably, the corona treatment level is about 1.7 kVA-min/m². Suitable corona treatment units are available from Enercon Industries Corp., Menomonee Falls, Wis. and from Sherman Treaters Ltd, Thame, Oxon, UK. Preferably the surface dyne level of the corona treated layer or layers is above 36 dynes, more preferably above 42 dynes, and most preferably above 50 dynes.

In the preferred embodiment of the invention, the moisture barrier layer and/or biodegradable polymer layer are uniaxially or biaxially oriented. Most preferably, both the moisture barrier layer and biodegradable polymer layer are biaxially oriented films. Preferably, in the present invention the moisture barrier layer and/or biodegradable polymer layer are films oriented to a draw ratio of from 1.5:1 to 5:1 biaxially in each of its machine (longitudinal) direction and transverse direction. For the purposes of the present invention the term draw ratio is an indication of the increase in the dimension in the direction of draw. Preferably, both the moisture barrier layer and the biodegradable polymer layer are simultaneously biaxially oriented. For example, in an in-line coating process, the moisture barrier layer and the biodegradable polymer layer are first attached to each other and then the combined plasticized layers are biaxially oriented together in both the machine and transverse directions at the same time. This results in dramatic improvements in strength and toughness properties. In an off-line coating process, the biodegradable polymer layer is typically biaxially oriented prior to application of the moisture barrier layer (e.g. by extrusion coating). In this case, only the biodegradable polymer layer is oriented.

The following non-limiting examples serve to illustrate the invention.

INVENTIVE EXAMPLES 1-5 AND COMPARATIVE EXAMPLES 1-5

For Inventive Examples 1-3 and Comparative Examples 1-3, a PVdC coating (DARAN® 8730, commercially available from Owensboro Specialty Polymers, LLC of Owensboro, Ky.) was applied on both CAPRAN® EMBLEM™ 2500 polyamide film (commercially available from Honeywell International Inc. of Morristown, N.J.) and EVLON® 25 micron biaxially oriented PLA film (commercially available from BI-AX International, Inc.) at dry coating weights of 0.13 lb/ream, 1.7 lb/ream, and 2.4 lb/ream and cured for 2 weeks. WVTR data was recorded based on ASTM E96 50% RH wet cup method and were compared to a control sample. The test results are summarized in Table 1 below.

For Inventive Examples 4-5 and Comparative Examples 4-5, the coated samples were laminated at base weights of 15 gsm and 30 gsm to non-woven spun bond polypropylene fabric (Style #308092, produced by Fiber Dynamics Inc. of High Point, N.C. and commercially available from Sommers Inc. of Coral Gables, Fla.) using a two part urethane adhesive (TYCEL® 7914/7287 commercially available from Liofol Company, which is a division of Henkel Technologies of Düsseldorf, Germany) at a coating weight of 2.5 lb/ream. The laminate composites were tested for tear propagation (Elmendorf Tear) via the ASTM D1922-06a testing method and were compared to a control sample. The minimum requirements were a Perm of from 0.5-5.0 and a tear propagation above 100 grams/laminate. The test results are summarized in Table 2 below.

TABLE 1

| Example | Sample Structures | Perm Value at 50% RH Wet Cup method |
|---|---|---|
| EMBLEM ™ Control | 1 mil (25.4 µm) CAPRAN ® EMBLEM ™ 2500 | 15.5 |
| Biax PLA Control | 1 mil EVLON ® Biax PLA | 8.50 |
| Comp. 1 | 1 mil CAPRAN ® EMBLEM ™ 2500 with 0.13 ppr PVdC | 8.75 |
| 1 | 1 mil EVLON ® Biax PLA with 0.13 ppr PVdC | 8.51 |
| Comp. 2 | 1 mil CAPRAN ® EMBLEM ™ 2500 with 1.7 ppr PVdC | 0.61 |
| 2 | 1 mil EVLON ® Biax PLA with 1.7 ppr PVdC | 0.57 |
| Comp. 3 | 1 mil CAPRAN ® EMBLEM ™ 2500 with 2.4 ppr PVdC | 0.34 |
| 3 | 1 mil EVLON ® Biax PLA with 2.4 ppr PVdC | 0.24 |

TABLE 2

| | | Elmendorf Tear (grams) | |
|---|---|---|---|
| Example | Structure | MD | TD |
| EMBLEM ™ Control | 1 mil CAPRAN ® EMBLEM ™ | 15-19 | 15-19 |
| Biax PLA Control | 1 mil EVLON ® Biax PLA | 34 | 22 |
| Comp. 4 | 1 mil CAPRAN ® EMBLEM ™/1.7 ppr PVdC/Adhesive 2.5 ppr/15 gsm non-woven PP | 192 | 326 |
| 4 | 1 mil EVLON ® PLA/1.7 ppr PVdC/Adhesive 2.5 ppr/15 gsm non-woven PP | 198 | 315 |
| Comp. 5 | 1 mil CAPRAN ® EMBLEM ™/PVdC 1.7 ppr/Adhesive 2.5 ppr/25 gsm non-woven PP | 368 | 536 |
| 5 | 1 mil EVLON ® PLA/PVdC 1.7 ppr/Adhesive 2.5 ppr/25 gsm non-woven PP | 339 | 680 |

The above results illustrate that the multilayer biodegradable films of the invention have a substantially reduced moisture permeability due to the application of an offline coating of moisture barrier layer (i.e. PVdC) of 1.7 ppr or greater. For an in-line coating the coating weight may be as low as 0.07 ppr. The inventive films achieve a similar performance to a nylon/PVdC film, but with the added benefit of biodegradability. The data further illustrates the significant improvement in tear strength due to the attachment of a fibrous substrate to the inventive films.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A multilayer article comprising, in order:
   a) a biodegradable polymer layer consisting of a polylactic acid polymer having a base weight of from about 15.0 grams/m² to 60 g/m² and a thickness of from about 10 µm to about 50 µm;
   b) an optional intermediate adhesive primer layer;
   c) a thermoplastic moisture barrier layer having a coating weight of from about 0.05 lb/ream to about 2.5 lb/ream, a thickness of from about 0.03 µm to about 6 µm, and a moisture vapor permeability rate of about 1 perm or less at 25% relative humidity and 21° C. as determined by 50% dry-cup method of ASTM E96, Procedure A, and wherein said thermoplastic moisture barrier layer comprises polyvinylidene chloride, polyvinyl alcohol, polyvinyl acetate, a polyamide, extrudable grade ethylene vinyl acetate, extrudable grade ethylene acrylic acid, an ethylene vinyl alcohol copolymer or a combination thereof;
   d) a first adhesive tie layer; and
   e) a fibrous substrate on the first adhesive tie layer.

2. The multilayer article of claim 1 wherein the moisture barrier layer has a moisture vapor permeability rate of from about 1 perm to about 40 perm at 95% relative humidity and 21° C. according to the 90% wet-cup method of ASTM E96, Procedure B.

3. The multilayer article of claim 1 wherein the article has a tear strength of above about 100 grams.

4. The multilayer article of claim 1 further comprising an insulation material attached to the fibrous substrate via a second adhesive tie layer.

5. The multilayer article of claim 1 wherein at least one of said biodegradable polymer layer and said moisture barrier layer comprises a uniaxially or biaxially oriented film.

6. The multilayer article of claim 1 wherein said moisture barrier layer has a thickness of about 4 µm or less.

7. The multilayer article of claim 1 wherein said fibrous substrate comprises a non-woven fabric.

8. The multilayer article of claim 1 wherein said fibrous substrate comprises polyamide fibers, polyolefin fibers, polyester fibers, biodegradable fibers or a combination thereof.

9. The multilayer article of claim 1 wherein said first adhesive tie layer comprises a polyurethane, an epoxy, a polyester, an acrylic polymer, an anhydride modified polyolefin, or a combination thereof.

10. The multilayer article of claim 1 wherein said optional intermediate adhesive primer layer is present.

11. The multilayer article of claim 1 wherein said fibrous substrate comprises a non-woven polypropylene fabric.

12. A method of producing a multilayer article, comprising:
   a) providing a biodegradable polymer layer consisting of a polylactic acid polymer having a base weight of from about 15.0 grams/m² to 60 g/m² and a thickness of from about 10 µm to about 50 µm;
   b) optionally applying an intermediate adhesive primer layer onto the biodegradable polymer layer;
   c) applying a thermoplastic moisture barrier layer onto the biodegradable polymer layer, the moisture barrier layer having a coating weight of from about 0.05 lb/ream to about 2.5 lb/ream, a thickness of from about 0.03 µm to about 6 µm, and a moisture vapor permeability rate of about 1 perm or less at 25% relative humidity and 21° C. as determined by 50% dry-cup method of ASTM E96, Procedure A, and wherein said moisture barrier layer comprises polyvinylidene chloride, polyvinyl alcohol, polyvinyl acetate, a polyamide, extrudable grade ethylene vinyl acetate, extrudable grade ethylene acrylic acid, an ethylene vinyl alcohol copolymer or a combination thereof;
   d) applying a first adhesive tie layer onto the moisture barrier layer; and
   e) applying a fibrous substrate on the first adhesive tie layer.

13. The method of claim 12 further comprising attaching an insulation material to the fibrous substrate via a second adhesive tie layer.

14. The method of claim 12 wherein at least one of said biodegradable polymer layer and said moisture barrier layer is uniaxially or biaxially oriented.

15. The method of claim 12 wherein an intermediate adhesive primer layer is applied onto the biodegradable polymer layer and the moisture barrier layer is applied onto the biodegradable polymer layer via the intermediate adhesive primer layer.

16. The method of claim 12 wherein said thermoplastic moisture barrier layer comprises a polyvinylidene chloride polymer.

17. The method of claim 12 wherein said thermoplastic moisture barrier layer comprises a thermoplastic polymer combined with a nanometer scale clay.

* * * * *